US010713411B1

(12) United States Patent
Chang

(10) Patent No.: US 10,713,411 B1
(45) Date of Patent: Jul. 14, 2020

(54) PHOTOLITHOGRAPHY MASK DESIGN-RULE CHECK ASSISTANCE

(71) Applicant: Marvell International Ltd., Hamilton (BM)

(72) Inventor: Runzi Chang, San Jose, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 10 days.

(21) Appl. No.: 16/037,552

(22) Filed: Jul. 17, 2018

Related U.S. Application Data

(60) Provisional application No. 62/619,614, filed on Jan. 19, 2018.

(51) Int. Cl.
*G06F 30/398* (2020.01)
*G03F 1/36* (2012.01)
*G03F 1/84* (2012.01)
*G06F 119/18* (2020.01)

(52) U.S. Cl.
CPC .............. *G06F 30/398* (2020.01); *G03F 1/36* (2013.01); *G03F 1/84* (2013.01); *G06F 2119/18* (2020.01)

(58) Field of Classification Search
CPC .. G03G 1/36; G03G 1/70; G03G 1/72; G03G 1/84; G06F 17/5068; G06F 17/5081; G06F 30/398

USPC ............................................................ 716/52
See application file for complete search history.

(56) References Cited

U.S. PATENT DOCUMENTS

| | | | | |
|---|---|---|---|---|
| 2003/0061583 | A1* | 3/2003 | Malhotra | G06F 17/5081 716/52 |
| 2004/0123264 | A1* | 6/2004 | Tsai | G06F 17/5081 716/52 |
| 2005/0257188 | A1* | 11/2005 | Kotani | G03F 1/36 716/52 |
| 2007/0237384 | A1* | 10/2007 | Bruce | G03F 1/84 382/144 |

OTHER PUBLICATIONS

"Design Rule Checking", Wikipedia; Retrieved from https://en.wikipedia.org/wiki/Design_rule_checking on Jul. 13, 2018, 3 pages.

* cited by examiner

*Primary Examiner* — Paul Dinh

(57) ABSTRACT

The present disclosure describes apparatuses and methods for correcting design rule violations. The apparatuses and methods, applicable to the design of features to be rendered onto a photolithography mask used in a semiconductor wafer-manufacturing environment, rely on a design-rule checker working in combination with a list of one or more solutions. The combination of the design-rule checker working with the list of one or more solutions provides for efficient and effective identification and resolution of design rule violations.

18 Claims, 5 Drawing Sheets

400 ⟶

Perform a design rule check of a photolithography-mask design file, the design rule check comparing, against a set of design rules, geometric dimensions of a feature
402

↓

Determine a violation of a rule contained within a set of design rules
404

↓

Resolve the violation of the rule contained within the set of design rules by updating the photolithography-mask design file, wherein updating the photolithography-mask design file comprises adjusting the feature in accordance with a solution
406

↓

Output the updated photolithography-mask design file
408

500

Receive an indication of a violation of a design rule, the design rule governing dimensions of a feature to be rendered onto a photolithography mask using a photolithography-mask design file
502

Generate a list of one or more solutions from a set of solutions, each solution of the list of one or more solutions intended to resolve the indicated violation of the design rule
504

Present the list of one or more solutions, the presentation enabling a selection of a solution from the list of one or more solutions, where the selection of a solution alters a geometric dimension of the feature to be rendered onto the photolithography mask
506

Fig. 5

PHOTOLITHOGRAPHY MASK DESIGN-RULE CHECK ASSISTANCE

CROSS REFERENCE TO RELATED APPLICATION

This present disclosure claims priority to U.S. Provisional Patent Application Ser. No. 62/619,614 filed Jan. 19, 2018, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

In the semiconductor wafer-fabrication industry, mask layout teams responsible for designing photolithography masks implement design rule sets. The design rule sets ensure that features rendered on a photolithography mask are correct so that corresponding features of an integrated circuit (IC) die, fabricated using patterns exposed via the photolithography mask, are correct in terms of dimensions and tolerances when manufactured as part of a photolithography process. Although multiple semiconductor wafer-fabrication facilities may manufacture wafers containing multiple IC die, each semiconductor-wafer fabrication facility may require a "tailored" mask set that accounts for variations and process capabilities of a group of semiconductor-wafer manufacturing tools at that semiconductor-wafer fabrication facility. Tailoring mask sets for each semiconductor-wafer fabrication facility requires design rule sets that specify certain geometric restrictions of features rendered onto the mask set, thereby ensuring sufficient margin with respect to manufacturing tool process capabilities as well as compounding effects of tolerance stack-ups inherent to semiconductor-wafer fabrication processes.

Today, a layout engineer may design a mask using computer-aided drafting (CAD) software. It is common for such software to include design rule checking (DRC) operations that might highlight, to the mask layout engineer, that a feature he is designing violates one or more rules of a design rule set. Such a violation may be, for example, a violation in a feature width, a violation in a spacing associated with the feature, or a violation of a feature enclosure.

Design rule sets are becoming increasingly more complex with each subsequent generation of semiconductor wafer-fabrication process technology. In deep sub-100 nanometer (nm) process technologies, for example, there can be tens of thousands of design rules that need checking to ensure that a mask set, tailored for a particular semiconductor-wafer fabrication facility, will yield functional IC die. Furthermore, for each of the design rules, there may be one or more solutions that the mask layout team may implement to resolve a violation.

Thus, rule checking is a computationally intense task followed by tedious searching and review of available solutions that will resolve the violation. With the sheer volume of design rules, an experienced layout engineer may have difficulty understanding a rule of a design rule set. Furthermore, the layout engineer may experience difficulties matching a violation of the rule to one or more solutions available to obviate the violation, especially for variances in design rules for different semiconductor-wafer manufacturing facilities.

SUMMARY

This summary is provided to introduce subject matter that is further described in the Detailed Description and Drawings. Accordingly, this Summary should not be considered to describe essential features nor used to limit the scope of the claimed subject matter.

The present disclosure describes apparatuses and methods for correcting design rule violations. The apparatuses and methods, applicable to the design of features to be rendered onto a photolithography mask used in a semiconductor wafer-manufacturing environment, rely on a design-rule checker working in combination with a list of one or more solutions. The combination of the design-rule checker working with the list of one or more solutions provides for efficient and effective identification and resolution of design rule violations.

In some aspects, a computer-implemented method is described. The computer-implemented method includes performing a design-rule check on a photolithography-mask design file, where the design-rule check compares, against a set of design rules, for example, geometric dimensions of a feature be rendered onto a photolithography mask using the photolithography-mask design file. Responsive to performing the design-rule check, a violation of a ruled contained within the set of design rules is determined. The violation of the rule contained within the set of design rules is resolved by updating the photolithography-mask design file, wherein updating the photolithography-mask design file comprises adjusting the feature in accordance with a solution. The updated photolithography-mask design file is then output, enabling rendering of the feature onto the photolithography mask in conformance with the rule.

In other aspects, a computer-implemented method is described. The method includes receiving an indication of a violation of a design rule, the design rule governing dimensions of a feature to be rendered onto a photolithography mask using a photolithography-mask design file. From a set of solutions, a list of one or more solutions is generated, where each solution of the list of one or more solutions is intended to resolve the violation of the design rule. The generated list of one or more solutions is then presented, where the selection of a solution resolves the indicated violation by altering a geometric dimension of the feature to be rendered onto the photolithography mask.

In yet other aspects, a computing device is described. The computing device comprises a display, a processor, and computer-readable storage media comprising instructions to implement a photolithography-mask designer application. The photolithography-mask designer application, when executed by the processor, is configured to cause the processor to perform multiple photolithography mask design operations including a design-rule check of a photolithography mask design file, wherein performing the design-rule check compares, to a set of design rules, geometric dimensions of a feature to be rendered onto a photolithography mask using the photolithography-mask design file. Responsive to performing the design-rule check, the computing device application may determine a violation of a rule contained within the set of design rules and also present, via the display, a list solutions to resolve the violation. Operations include the computing device receiving an input that updates the photolithography-mask design file by adjusting the feature in accordance with one or more solutions from the set of solutions and also outputting the updated photolithography-mask design file, enabling rendering of the feature onto the photolithography mask in conformance with the rule.

The details of one or more implementations are set forth in the accompanying drawings and the following description. Other features and advantages will be apparent from the description and drawings, and from the claims.

BRIEF DESCRIPTION OF THE DRAWINGS

The details of one or more aspects of methods for using a design-rule checker in combination with a list of one or more solutions are described below. The use of the same reference numbers in different instances in the description and the figures may indicate like elements:

FIG. 5 illustrates an example computer-implemented method for presenting a list of one or more solutions in accordance with one or more implementations.

DETAILED DESCRIPTION

A layout engineer may use a system, such as a computer-aided drafting (CAD) workstation having a design-rule checker working in combination with a list of one or more solutions, to resolve design rule violations while generating a photolithography-mask design file. A photolithography mask shop may use the photolithography-mask design file to render features, as indicated by the photolithography-mask design file, onto a photolithography mask. A semiconductor-wafer fabrication facility may then, in turn, use the photolithography mask to fabricate corresponding features of one or more integrated circuit (IC) die as part of a particular layer of a semiconductor wafer.

In particular, a layout engineer at an electronic design automation (EDA) or fabless company may not have intricate knowledge associated with a particular semiconductor-wafer fabrication facility in terms of manufacturing tool installation, planned or scheduled changes in manufacturing tools, process technologies, and so forth. In such instances, the design-rule checker and the list of one or more solutions to design rule violations will, if tailored and updated to account for such information, yield multiple benefits. In addition to improving manufacturing yields at the semiconductor-wafer fabrication facility (e.g., yields associated with functionality of IC die), a layout engineer employing the design-rule checker with the list of one or more solutions may improve efficiency and effectiveness of photolithography-mask design processes, improve management and sharing of successful solutions that resolve design rule violations, reduce occurrence rates of design rule violations, and improve product time-to-market timelines (to name but a few).

Operating Environment

Figure 1:
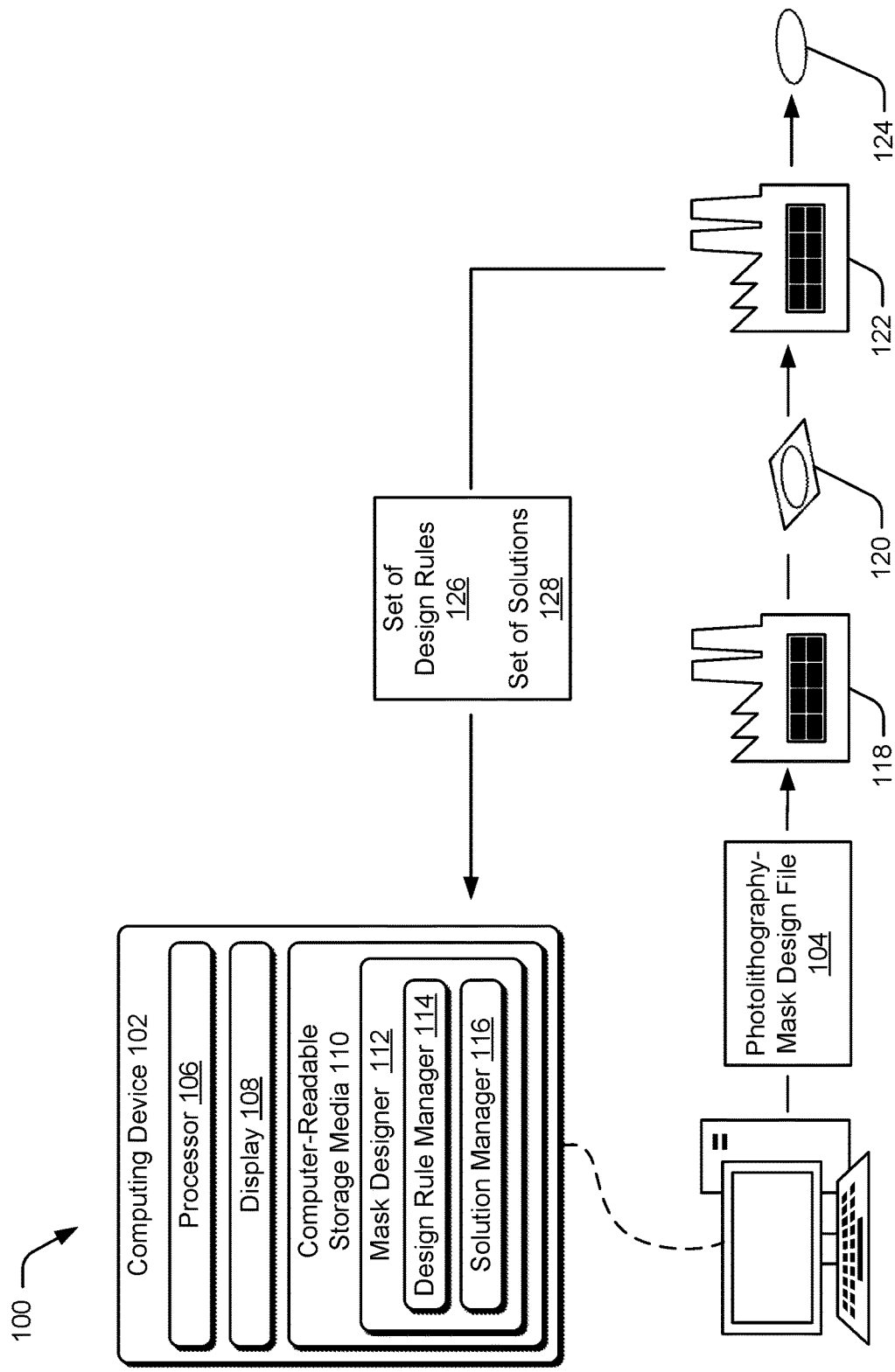
FIG. 1 illustrates an example operating environment having a computing device for generating and outputting a photolithography-mask design file.

FIG. 1 illustrates an example operating environment 100 having a computing device 102 for generating and outputting a photolithography-mask design file 104. Although depicted as a workstation, the computing device 102 may be implemented through cloud computing or distributing computing with other computing devices or remote processing resources. In general, a user (e.g., a layout engineer) may use the computing device to generate and output a photolithography-mask design file. It should be noted that only the features of the computing device 102 related to the techniques described herein are illustrated here for the sake of clarity The computing device 102 includes a processor 106, a display 108, and computer-readable storage media (CRM) 110. The processor 106 can be any suitable type of processor, either single-core or multicore, for executing instructions or commands stored in the computer-readable storage media 110. The display 108 may, in certain instances, be a touch-screen display capable of receiving a touch input from the user of the computing device 102.

The computer-readable storage media 110 may include any suitable memory or storage device such as dynamic random-access memory (DRAM), static RAM (SRAM), dynamic RAM (DRAM), non-volatile RAM (NVRAM), read-only memory (ROM), or Flash memory useful to store code, data, and/or information of the computing device 102. In the context of the disclosure, the computer-readable storage media 110 is configured as storage media, and thus does not include transitory signals or carrier waves.

In aspects of the computing device 102, the computer-readable storage media 110 includes applications comprised of executable code or instructions, including a mask designer 112 having a design-rule manager 114 and a solution manager 116. When executed by the processor 106, the mask designer 112 may aid a user in generating an outputting the photolithography-mask design file 104. Alternately or additionally, the mask designer 112 may be implemented in whole or part as hardware logic or circuitry integrated with or separate from other components of the computing device 102.

The user may interface with the computing device 102 as the processor 106 is executing the code of the mask designer 112 to generate and output the photolithography-mask design file 104. While executing the code of the mask designer 112, the user may view, via the display 108, geometric dimensions of a set of features to be rendered onto a photolithography mask that will be used to fabricate a semiconductor wafer.

Such features, in general, are opaque to energy that a photolithography exposure tool radiates through the photolithography mask and onto a thin film of photoresist material coating the semiconductor wafer. Depending on a nature of the thin film photoresist material (e.g., a positive photoresist or negative photoresist), a photolithography develop tool may subsequently develop (e.g., remove) respective portions of the thin film of photoresist material to reveal portions of an underlying layer of material. An etching tool may then etch the revealed portions of the underlying layer of material to pattern the semiconductor wafer with a features that correspond to features rendered onto the photolithography mask.

Once the photolithography-mask design file is complete 104, the computing device 102 may output the photolithography-mask design file to a photolithography-mask shop 118, which may use a variety of techniques to fabricate a photolithography mask 120. Such techniques may include, for example, depositing an opaque material (e.g., a chrome metal-absorbing film) onto a transparent material (e.g., a fused silica) and selectively removing portions of the opaque material in accordance with the photolithography-mask design file to render the set of features on to the photolithography mask 120. The photolithography mask 120 may then be sent to a semiconductor-wafer fabrication facility 122 for use with a photolithography exposure tool to pattern a layer of a semiconductor wafer 124.

In some instances, designers of an integrated-circuit (IC) device may provide input to the set of design rules 126 that include prescribing geometric dimensions of features to ensure performance characteristics of the IC die. In other instances, and to ensure that the photolithography mask 120 is compatible with process capabilities of the semiconductor-wafer fabrication facility 122, manufacturing experts may modify and adjust the set of design rules 126. The manufacturing experts may also provide a set of solutions 128 for a user (e.g., a layout engineer) to implement if the user violates design rules from the set of design rules 126 while he is laying out the photolithography mask 120. In some instances, the set of design rules 126 and the set of solutions 128 may be provided to the user in the form of a hardcopy while in other instances the set of design rules 126 and the set of solutions 128 may be received by the computing device 102 in the form of an electronic design automation (EDA) file which may be encrypted. The set of design rules 126 and the set of solutions 128 may be stored, respectfully, as part of the design-rule manager 114 and the solution manager 116.

The set of design rules 126 may account for process capabilities of a group of semiconductor-wafer manufacturing tools. For each semiconductor-manufacturing tool of the group, a manufacturing engineer can measure feature sizes of an IC die produced by the semiconductor-manufacturing tool and compare the "as produced" feature sizes to the "as designed" feature sizes. From the comparison, the manufacturing engineer can determine, for each manufacturing tool, the manufacturing tool's ability to produce IC die having feature sizes centered about upper and lower control limits. The manufacturing engineer often statistically quantifies this determination as manufacturing tool's process capability ($C_pk$).

In certain instances, while the processor 106 is executing the code or instructions of the mask designer 112, the design-rule manager 114 may perform a design rule check compare, against the set of design rules 126, geometric dimensions of a feature be rendered onto a photolithography mask from the photolithography-mask design file. Responsive to performing the design rule check, the design-rule manager 114 may determine a violation of a rule contained within the set of design rules and cause the display 108 of the computing device 102 to present to the user information indicative of the violation of the rule. The solution manager 116 may then cause the display of the computing device 102 to present a list of one or more solutions derived from the set of solutions 128, one or more of which may be used by the user to resolve the violation of the rule.

In certain instances, the user may then provide an input to the computing device 102 in accordance with one or more solutions from the set of solutions. Such an input may be, for example, stretching or relocating the feature via a mouse or stylus, keying in a specific geometric dimension of the feature via a keyboard, a selection from the set of solutions via a touch screen interface, an audible command, or the like. The input, as received by the computing device 102, adjusts the feature in accordance with the one or more solutions from the list of one or more solutions. Alternatively, and in certain instances, the design-rule manager 114 may automatically adjust the feature in accordance with the one or more solutions from the list of one or more solutions. According to one embodiment, the design-rule manager 114 provides an indication that the feature has been automatically adjusted. In one such embodiment, the design-rule manager 114 may provide details of the adjustment. The design-rule manager 114 may also provide the user with an opportunity to confirm or reject the adjustment.

The user may then cause the computing device 102 to output the updated photolithography-mask design file as well as the updated set of solutions. In the case of the updated photolithography-mask design file, the photolithography-mask shop 118 is enabled to render the feature onto the photolithography mask 120 in conformance with the rule.

Techniques for Photolithography Mask Design-Rule Check Assistance

Figure 2:
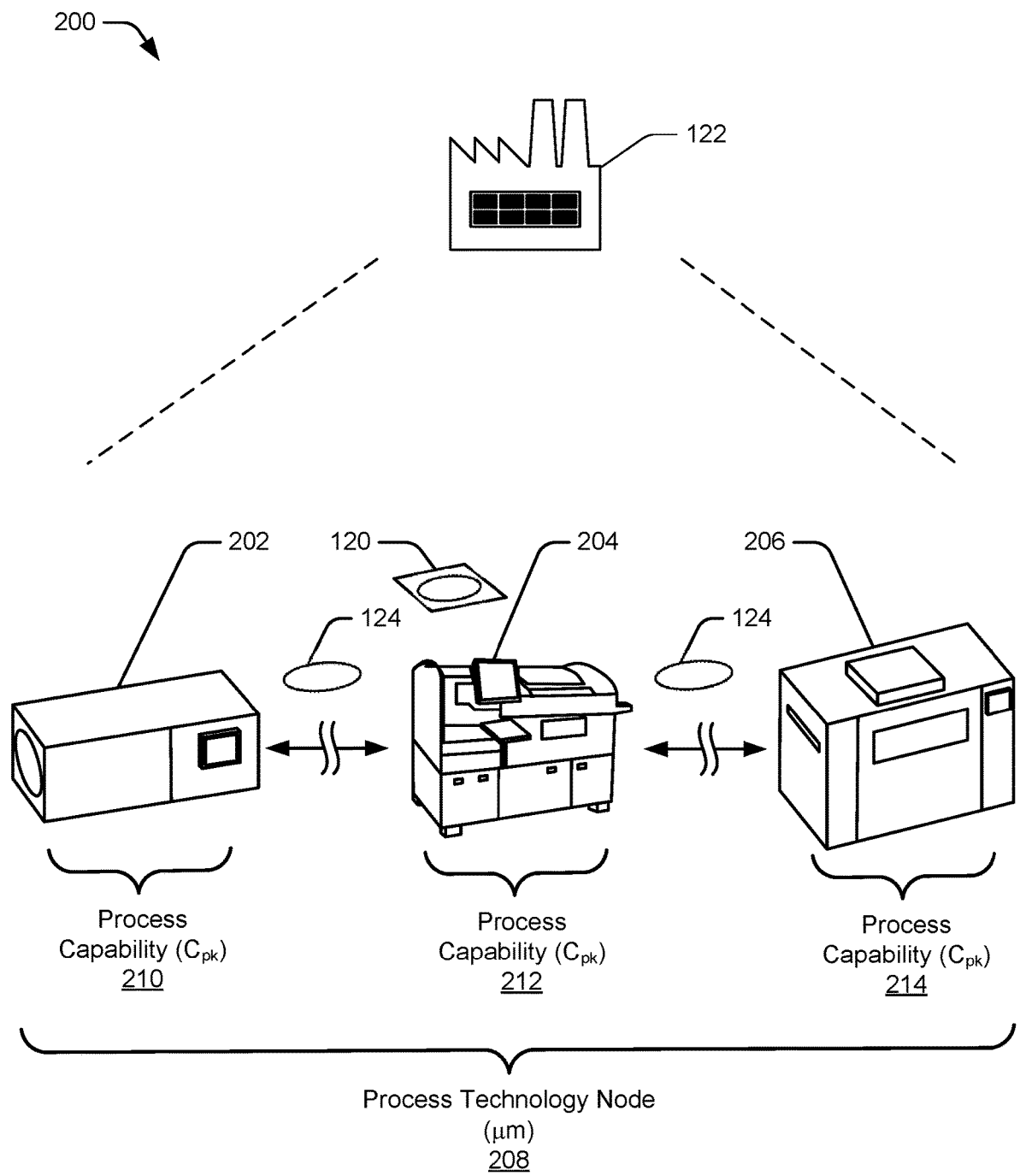
FIG. 2 illustrates details of an example group of semiconductor-wafer manufacturing tools of a semiconductor-wafer fabrication facility.

FIG. 2 illustrates details 200 of an example group of semiconductor-wafer manufacturing tools of a semiconductor-wafer fabrication facility. The details 200 are generally in accordance with one or more aspects of the semiconductor-wafer fabrication facility 122 of FIG. 1 and are applicable to establishing the set of design rules 126 and the set of solutions 128 of FIG. 1.

As illustrated, the group of semiconductor-wafer manufacturing tools include a deposition tool 202, a photolithography exposure tool 204, and an etching tool 206. In general, the group of semiconductor-wafer manufacturing tools may perform sequences of manufacturing process steps to fabricate a semiconductor wafer containing multiple integrated-circuit (IC) die. Such IC die may be in the form of logic/microprocessor die, application-specific integrated circuit (ASIC) die, system-on-chip (SoC) die, memory die, or the like. In general, the group of semiconductor-wafer manufacturing tools may perform to a process-technology node 208 that is common and shared. The process-technology node 208 is typically associated with a minimum line width (e.g., feature size or geometric dimension) that the group of semiconductor-wafer manufacturing tools are capable of forming.

In general, the deposition tool 202 deposits a layer of material onto the semiconductor wafer 124. The deposition tool 202 may, for example, deposit the layer of material using a chemical vapor deposition (CVD) process, a physical vapor deposition (PVD) process, a plating process, or the like. Example layers of materials include materials such as silicon dioxide, silicon nitride, aluminum, borophosphosilicate glass, copper, or the like. The deposition tool 202 has an inherent process capability ($C_pk$) 210 to deposit the layer of material to a thickness that supports manufacturing in accordance with the process-technology node 208. The process capability 210 may be influenced by, for example, temperature and pressure controls of a deposition chamber, time duration controls associated with deposition processes, or the like. Once the thin layer of material has been deposited onto the semiconductor wafer 124, a coating tool (not illustrated) may coat the layer of material with a thin film of photoresist so that features of an IC die might be fabricated from the layer of material using subsequent photolithography exposure, developing, and etching manufacturing processes.

In general, the photolithography exposure tool 204 radiates energy or particles, such as ultraviolet light (UV), extreme-ultraviolet (EUV) light, electron-beams, ion-beams, or x-ray electromagnetic waves through the photolithography mask 120 and onto the thin film of photoresist material coating the semiconductor wafer 124 (the photolithography mask 120 is illustrated "outside" the photolithography exposure tool 204 for clarity). The photolithography exposure tool 204 has a process capability ($C_p k$) 212 to pattern features onto the thin film of photoresist material in accordance with the process-technology node 208. The process capability 212 may be influenced by, for example, the registration or alignment of the photolithography mask 120 to the semiconductor wafer 124, optical resolution of lenses through which radiated energy passes, time durations controls associated with radiating energy through the lenses and the photolithography mask 120, pressure and temperature controls of an exposure chamber, and the like.

In general, the etching tool 206 etches exposed portions of a layer of material to pattern the semiconductor wafer 124 with a set of features corresponding to the set of features rendered onto the photolithography mask 120. The etching tool 206 removes exposed portions of the layer of material (exposed via a develop tool that removes portions of the thin film of photoresist material, not shown) via a dry-etch process, a wet-etch process, or the like. The etching tool 206 has an inherent process capability ($C_p k$) 214 to etch features in accordance with the process-technology node 208. The process capability 212 may be influenced by, for example, temperature and pressure controls of an etching chamber, time duration controls associated with etching processes, or the like.

It is important to note that a group of semiconductor-wafer manufacturing tools of one semiconductor-wafer manufacturing facility may vary from another group of semiconductor-wafer manufacturing tools of another semiconductor-wafer manufacturing facility in terms of vendor, design, configuration, and so forth. Such variations may result in differing process capabilities ($C_p k$s), resulting in different sets of design rules for different semiconductor-wafer manufacturing facilities.

Figure 3:
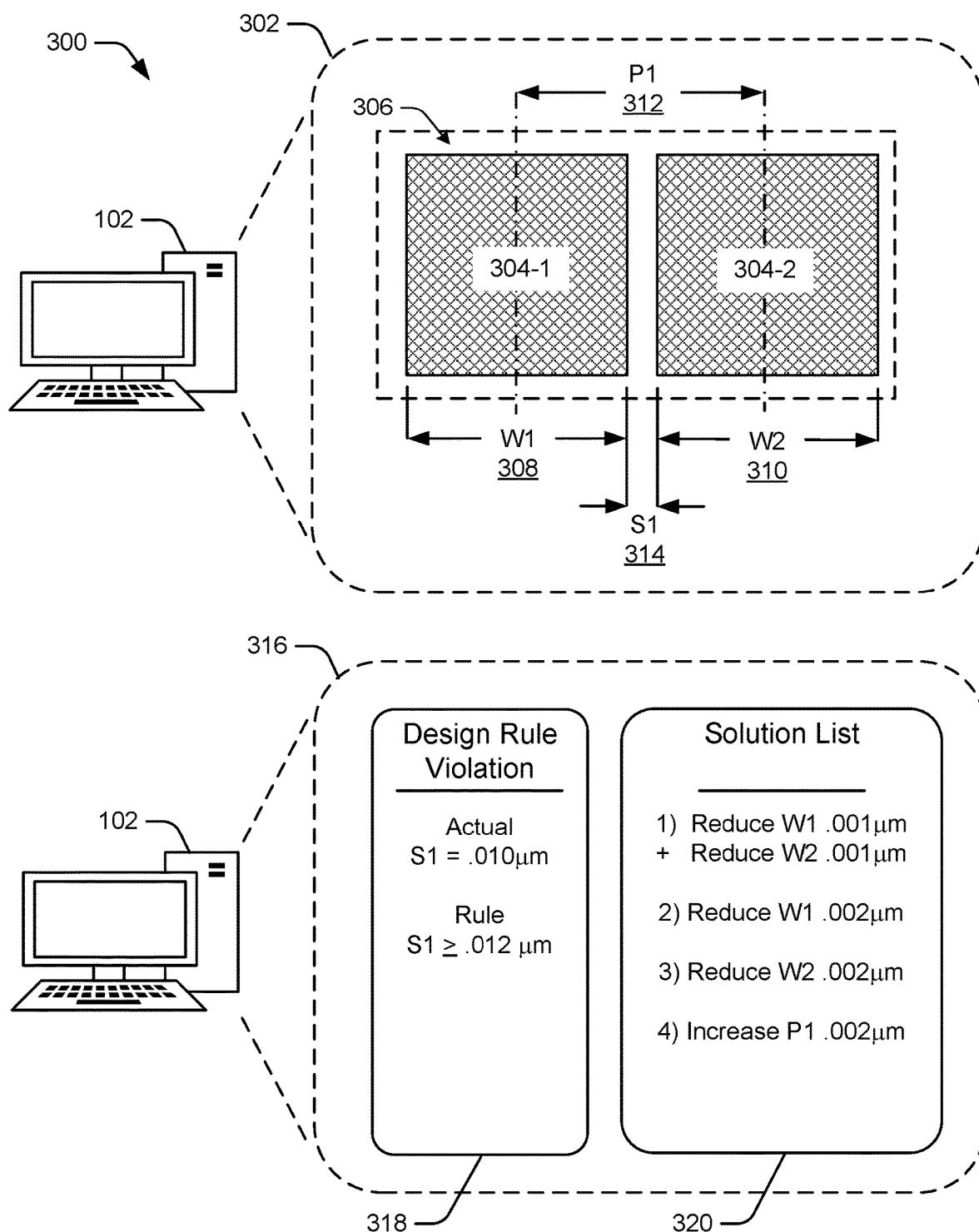
FIG. 3 illustrates example details of a list of one or more solutions assisting a design rule checking operation.

FIG. 3 illustrates example details 300 of a list of one or more solutions assisting a design rule checking operation. The details 300 are generally in accordance with one or more aspects of the computing device 102 (e.g., the processor 106) executing code or instructions of the mask designer 112, including the design-rule manager 114 and the solution manager 116.

As depicted in detail 302, the computing device 102 (e.g., the processor 106) is executing code of the mask designer 112 and presenting (via the display 108) an example feature to be rendered onto the photolithography mask 120. The example feature, in this instance intended to expose portions of perimeters surrounding bond pads of an integrated-circuit (IC) die, includes opaque portions 304-1 and 304-2 (corresponding to respective bond pads) and transparent portion 306 (corresponding to respective perimeters). As illustrated, opaque portion 304-1 has a geometric dimension corresponding to a width 308 while opaque portion 304-2 has a geometric dimension corresponding to a width 310. Furthermore, the portion 304-1 and the opaque portion 304-2 are located relative to one another in accordance with a pitch 312 and are separated from each other by a space 314.

As depicted in detail 316, the computing device 102 (e.g., the processor 106) is executing code of the design-rule manager 114 and the solution manager 116. The design-rule manager performs a design-rule check of a photolithography-mask design file containing the feature, and in response to determining a violation of a design rule (e.g., a design rule from the set of design rules 126), the design-rule manager 114 causes the computing device to present (via the display 108) an indication of the determined violation. In this instance, the example feature violates a design rule requiring that the geometric dimension of the space 314≥0.012 μm, as the actual geometric dimension of the space 314 is equal to 0.010 μm. The design rule may be in place, for example, to avoid "bridging" between the bond pads to be patterned from the feature being rendered on to a photolithography mask (e.g., a photolithography mask such as the photolithography mask 120) and fabricated in accordance with the process capabilities of a group of semiconductor-wafer manufacturing tools (e.g., a group including semiconductor-wafer manufacturing tools such as the photolithography exposure tool 204 and the etching tool 206).

As depicted by detail 316, the solution manager 116 may present a list of one or more solutions. The solution manager 116 may generate the list of one or more solutions in a modular fashion, where the list of one or more solutions includes solutions that are applicable to resolving the determined violation and excludes solutions that are not applicable to resolving the determined violation. To generate the list of one or more solutions in such a fashion the solution manager 116 may, for example, rely on attributes that might reside in the set of solutions (e.g., certain solutions from the set of solutions may be "tagged" as applicable to resolving the determined violation while other solutions are not). Alternatively, and as another example, the solution manager 116 may rely on statistics that associate historic selections of solutions to determined violations of design rules. Generating the list of one or more solutions in the modular fashion leads to an effective and efficient resolution of the determined violation, preventing a user from having to search through a large quantity of solutions that may (or may not) be applicable to resolving the determined violation.

The solution manager 116 may further present the list of one or more solutions in an order that prioritizes solutions. The ordering of the list of one or more solutions may, in certain instances, be generated via a machine-learning algorithm or an artificial-intelligence (AI) algorithm included in the solution manager 116 that weight a solution based on factors associated with design for manufacturability (e.g., the general design of the IC die in such a way that the IC die is easy to manufacture with the group semiconductor-wafer manufacturing tools), known or predicted impact to integrated-circuit (IC) die yields, risk priority numbers associated fail mode effects analysis (FMEA) techniques, number of times the solution has been selected, or the like.

Although the illustrated feature of FIG. 3 is configured for manufacturing bond pads on an integrated-circuit (IC) device, the feature is non-limiting and for example only. Other configurations for manufacturing transistors, gates, memory cells, vertical interconnect access (via) connections, or other elements that can be found as part of an integrated-circuit (IC) device may be subject to the operations performed by the mask designer 112, including the design-rule checker 114 and the solution manager 116.

Figure 4:
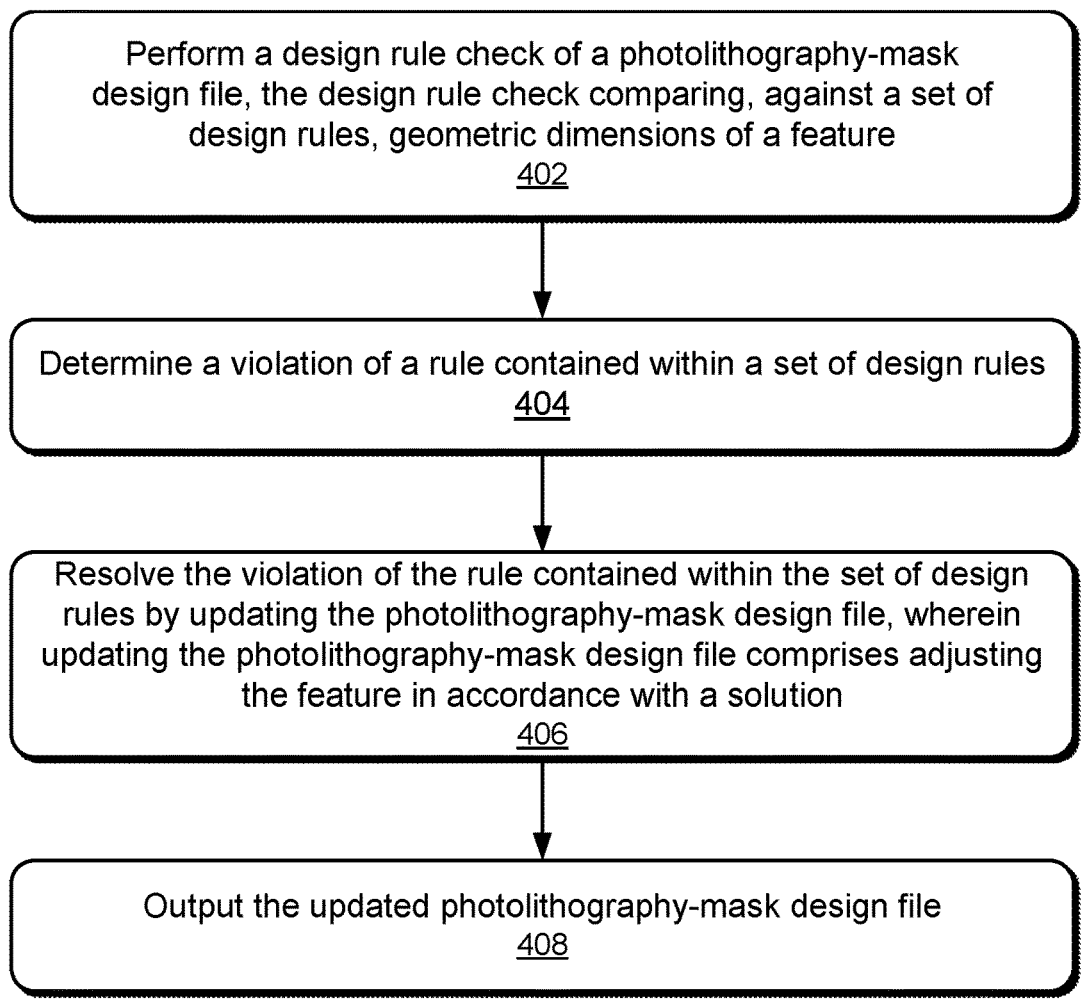
FIG. 4 illustrates an example computer-implemented method for outputting a photolithography-mask design file in accordance with one or more implementations.

FIG. 4 illustrates an example computer-implemented method 400 for outputting a photolithography-mask design file in accordance with one or more implementations, including operations performed by the computing device 102 (e.g., the processor 106) executing code or instructions of the mask designer 112, including the design-rule manager 114 and the solution manager 116.

At 402, a design-rule check on a photolithography-mask design file (e.g., the photolithography-mask design file 104) is performed, the design-rule check comparing, to a set of design rules (e.g., the set of design rules 126), geometric dimensions of a feature be rendered onto a photolithography mask using the photolithography-mask design file. The computing device 102 may perform the design-rule check by executing code or instructions of the design-rule manager 114. The geometric dimensions of feature may be associated with a width of the feature, a spacing of the feature, an enclosure of the feature, or the like.

At 404, and responsive to performing the design-rule check, a violation of a rule contained within the set of design rules is determined. The design-rule manager 114 may perform the determination and cause the computing device 102 to present the determined violation via a display of the computing device 102 (e.g., the display 108).

At 406, the violation of the rule contained within the set of design rules is resolved by updating the photolithography mask design file. Updating the photolithography-mask design file comprises adjusting the feature in accordance with a solution. In some instances, the solution may be from a list of one or more solutions. The list of one or more solutions may further be ordered based on factors associated with Design for Manufacturability (e.g., ease of manufacturing or compatibility with semiconductor-wafer manufacturing tools), known or predicted impact to integrated-circuit (IC) die yields, risk priority numbers associated fail mode effects analysis (FMEA) techniques, a prior selection of a listed solution, or the like.

Adjusting the feature in accordance with the solution, in some instances, may be automatically performed via execution of or instructions contained within the design rule manager 114. Adjusting the feature in accordance with the solution may include several aspects, including, for example, providing details of the adjustment to the user, providing the user with an opportunity to confirm or reject the adjustment, or simply adjusting the feature without any prompting or notification to the user.

In other instances, adjusting the feature in accordance with the solution may rely on the solution manager presenting, via the display 108 of the computing device, the list of one or more solutions, after which the user may adjust the feature via providing one or more inputs to the computing device. The input may be a may be a stretching or relocating of the feature via mouse or stylus, keying in a specific geometric dimension of the feature, a selection from the list of one or more solutions, an audible command, or the like.

In certain instances, adjusting the feature may trigger an automated adjustment of another feature that may have an interdependency with the feature. This can include, for example, the design rule manager 114 adjusting geometric dimensions associated with a datum used to locate the feature and the other feature relative to one another, reducing a geometric dimension of the other feature such that a spacing rule is maintained, or the like.

At 408, the computing device 102 outputs the updated photolithography-mask design file 104, enabling rendering of the feature onto the photolithography mask in conformance with the rule.

FIG. 5 illustrates an example computer-implemented method 500 for presenting a list of one or more solutions in accordance with one or more implementations, including operations performed by the computing device 102 (e.g., the processor 106) executing code of instructions of the mask designer 112 including the solution manager 116.

At 502, the computing device 102 receives an indication of a violation of a design rule that governs dimensions of a feature to be rendered onto a photolithography mask (e.g., the photolithography mask 120) using a photolithography-mask design file (e.g., the photolithography-mask design file 104).

At 504, the computing device 102 generates a list of one or more solutions from a set of solutions (e.g., the set of solutions 128), where each solution of the list of one or more solutions is intended to resolve the indicated violation of the design rule. As part of 504, the computing device 102 executes code or instructions of the solution manager 116 to generate the list of one or more solutions from the set of solutions 128. The solution manager 116 may generate the list of one or more solutions in a modular fashion, where the list of one or more solutions includes solutions that are applicable to resolving the indicated violation of the design rule and excludes solutions that are not applicable to resolving the indicated violation of the design rule. In certain instances, the list may be ordered based on the solution manager 116 using a machine-learning algorithm or an Artificial-Intelligence (AI) algorithm to weight factors associated with Design for Manufacturability (e.g., ease of manufacturing or compatibility with semiconductor-wafer manufacturing tools), known or predicted impact to integrated-circuit (IC) die yields, risk priority numbers associated fail mode effects analysis (FMEA) techniques, a prior selection of a listed solution, or the like.

At 506, the computing device 102 presents the list of one or more solutions, where presenting the list of one or more solutions enables a selection of a solution and where the selection of a solution resolves the indicated violation by altering a geometric dimension of the feature to be rendered onto the photolithography mask. Altering the geometric dimension of the feature results in the photolithography-mask (fabricated according to photolithography-mask design file) being compatible with a group of semiconductor-wafer manufacturing tools associated with a particular semiconductor-fabrication facility, effective to improve functional yields of integrated-circuit (IC) die fabricated using the photolithography mask.

The aforementioned methods, when performed by the computing device 102, provide the user a straightforward method of resolving design rule violations via the list of one or more solutions. Qualities of the list of one or more solutions, as managed by the solution manager 116, include aspects associated with the described ordering well as aspects associated with modularity (e.g., the list of one or more solutions including solutions that are applicable to resolving a determined violation and excluding solutions that are not applicable to resolving the determined violation).

Such aspects provide a means for a user to improve productivities that may be directly or indirectly related to advanced integrated-circuit (IC) device design. Example improvements include better integration of semiconductor-wafer fabrication facility requirements with IC die design practices, faster cycle-of-learnings, an improved consistency in resolving design rule violations, and a reduction in design rule errors, ultimately leading to more competitive response times for a given time-to-market.

What is claimed is:

1. A computer-implemented method comprising:
    performing, by a computer processor of a computing device, a design-rule check on a photolithography-mask design file, the design-rule check comparing, to a set of design rules, geometric dimensions of a feature to be rendered onto a photolithography mask using the photolithography-mask design file;
    determining, by the computer processor and responsive to performing the design-rule check, a violation of a rule contained within the set of design rules;

presenting, by the computer processor and via a display of the computing device, a list of one or more user-selectable solutions applicable to resolving the determined violation;

receiving, by the computer processor, a user input indicating a user-selected solution from the list of one or more user-selectable solutions;

resolving, by the computer processor, the violation of the rule contained within the set of design rules by updating the photolithography-mask design file, wherein updating the photolithography mask design file comprises adjusting the feature in accordance with the user-selected solution; and outputting, by the computer processor, the updated photolithography-mask design file, the updated photolithography-mask design file enabling rendering of the feature onto the photolithography mask in conformance with the rule.

2. The computer-implemented method as recited in claim 1, wherein determining the violation of the rule contained within the set of design rules determines a violation of one or more process capabilities of a group of semiconductor-wafer manufacturing tools.

3. The computer-implemented method as recited in claim 1, wherein determining the violation of the rule contained within the set of design rules determines a violation of one or more prescribed geometric dimensions of the feature.

4. The computer-implemented method as recited in claim 1, wherein determining the violation of the rule contained within the set of design rules determines a violation of a width associated with the feature, a violation in a spacing associated with the feature, or a violation of an enclosure associated with the feature.

5. The computer-implemented method as recited in claim 1, wherein presenting the list of one or more user-selectable solutions includes presenting an ordered list of one or more user-selectable solutions based on factors associated with design for manufacturability (DFM), known or predicted impact to integrated-circuit (IC) die yields, risk priority numbers associated with fail mode effects analysis (FMEA) techniques, or a number of times a solution has been selected.

6. The computer-implemented method as recited in claim 1, wherein generating the list of one or more user-selectable solutions comprises including applicable solutions that are applicable to resolving the determined violation and excluding non-applicable solutions that are not applicable to resolving the determined violation.

7. The computer-implemented method as recited in claim 1, further comprising generating the list of one or more user-selectable solutions in a modular fashion such that the list includes applicable solutions that are applicable to resolving the determined violation and excludes non-applicable solutions that are not applicable to resolving the determined violation.

8. The computer-implemented method as recited in claim 1, further comprising generating the list of one or more user-selectable solutions based on statistics that associate previously-selected solutions to previously-determined violations of design rules.

9. The computer-implemented method as recited in claim 1, wherein:
the list of one or more user-selectable solutions includes a plurality of solutions; and
the presenting of the list includes presenting the list in an order that prioritizes the plurality of solutions; and the order of the list is generated via a machine-learning algorithm that applies weights to each solution of the plurality of solutions based on one or more factors.

10. A computing device comprising:
a display;
a processor; and
computer-readable storage media comprising instructions to implement a photolithography-mask designer application, the photolithography-mask designer application configured to cause the processor to:
perform a design-rule check on a photolithography-mask design file, the design-rule check comparing, to a set of design rules, geometric dimensions of a feature be rendered onto a photolithography mask using the photolithography-mask design file;
determine, responsive to performing the design-rule check, a violation of a rule contained within the set of design rules;
present, via the display, a list of one or more user-selectable solutions applicable to resolving the determined violation;
receive a user selection of a solution from the list of one or more user-selectable solutions;
resolve the violation of the rule contained within the set of design rules by updating the photolithography-mask design file, the updating including adjusting the feature in accordance with the user-selected solution; and
output the updated photolithography-mask design file, the updated photolithography-mask design file enabling rendering of the feature onto the photolithography mask in conformance with the rule.

11. The computing device as recited in claim 10, wherein the photolithography-mask designer application is further configured to cause the processor to determine the violation of the rule contained within the set of design rules by determining a violation of one or more process capabilities of a group of semiconductor-wafer manufacturing tools.

12. The computing device as recited in claim 10, wherein the photolithography-mask designer application is further configured to cause the processor to determine the violation of the rule contained within the set of design rules by determining a violation of a width associated with the feature, a violation in a spacing associated with the feature, or a violation of an enclosure associated with the feature.

13. The computing device as recited in claim 10, wherein the photolithography-mask designer application is further configured to cause the processor to present the list as an ordered list of one or more user-selectable solutions based on factors associated with design for manufacturability (DFM), known or predicted impact to integrated-circuit (IC) die yields, risk priority numbers associated with fail mode effects analysis (FMEA) techniques, or a number of times a solution has been selected.

14. The computing device as recited in claim 10, wherein the photolithography-mask designer application is further configured to cause the processor to:
generate the list from a set of solutions corresponding to the set of design rules;
including in the list applicable solutions that are applicable to resolving the determined violation; and
excluding from the list non-applicable solutions that are not applicable to resolving the determined violation.

15. The computing device as recited in claim 10, wherein the photolithography-mask designer application is configured to cause the processor to generate the list of one or more user-selectable solutions based on statistics that associate previously-selected solutions to previously-determined violations of design rules from the set of design rules.

16. Computer code stored on computer-readable storage media that, responsive to execution by a computer processor, implements a photolithography-mask designer application configured to:
   perform a design-rule check on a photolithography-mask design file, the design-rule check comparing, to a set of design rules, geometric dimensions of a feature be rendered onto a photolithography mask using the photolithography-mask design file;
   determine, responsive to performing the design-rule check, a violation of a rule contained within the set of design rules;
   present, via the display, a list of one or more user-selectable solutions applicable to resolving the determined violation;
   receive a user selection of a solution from the list of one or more user-selectable solutions;
   resolve the violation of the rule contained within the set of design rules by updating the photolithography-mask design file, the updating including adjusting the feature in accordance with the user-selected solution; and
   output the updated photolithography-mask design file, the updated photolithography-mask design file enabling rendering of the feature onto the photolithography mask in conformance with the rule.

17. The computer code of claim 16, wherein the photolithography-mask designer application is configured to determine the violation of the rule as a violation of a width associated with the feature, a violation in a spacing associated with the feature, or a violation of an enclosure associated with the feature.

18. The computer code of claim 16, wherein the photolithography-mask designer application is configured to present the list as an ordered list of one or more user-selectable solutions based on factors associated with design for manufacturability (DFM), known or predicted impact to integrated-circuit (IC) die yields, risk priority numbers associated with fail mode effects analysis (FMEA) techniques, or a number of times a solution has been selected.

* * * * *